United States Patent [19]
Milligan

[11] 3,823,945
[45] July 16, 1974

[54] CONTROLLED TRANSPORT OF A FLEXIBLE MEDIUM

[75] Inventor: Lee J. Milligan, Fairfield, N.J.

[73] Assignee: Peripheral Systems Corp., Fairfield, N.J.

[22] Filed: Nov. 29, 1971

[21] Appl. No.: 202,888

Related U.S. Application Data

[63] Continuation-in-part of Ser. No. 159,502, July 2, 1971, abandoned.

[52] U.S. Cl. .................. 360/96, 242/188, 360/105
[51] Int. Cl. .................. G11b 5/00
[58] Field of Search ........ 274/4 D, 4 C, 11 D, 11 C; 242/199, 200

[56] References Cited

UNITED STATES PATENTS

| | | | |
|---|---|---|---|
| 2,683,568 | 7/1954 | Lindsay | 242/57 |
| 3,141,626 | 7/1964 | Hoskin | 242/204 X |
| 3,417,938 | 12/1968 | Markakis et al. | 242/200 |
| 3,485,963 | 12/1969 | Murata | 274/4 C |
| 3,498,570 | 3/1970 | Scholfield | 242/203 |
| 3,586,336 | 6/1971 | Rosenblatt | 274/4 E |
| 3,641,282 | 2/1972 | Martin | 274/4 D |
| 3,664,672 | 5/1972 | Fujikawa et al. | 274/4 D |
| 3,677,555 | 7/1972 | Vail | 274/4 D |

FOREIGN PATENTS OR APPLICATIONS

| | | | |
|---|---|---|---|
| 1,254,377 | 11/1967 | Germany | 242/188 |

*Primary Examiner*—Harry N. Haroian
*Attorney, Agent, or Firm*—George E. Kersey

[57] ABSTRACT

A tape transport unit with a main deck plate that accommodates a magnetic tape cassette against two vertically disposed support pins. A tape head for the cassette is mounted on a spring loaded head plate that is slidably received by the main deck plate on two horizontally disposed support pins. The tape of the cassette is driven by being sandwiched between a drive capstan and a roller wheel of a pinch roller assembly that is pivotally mounted on the head plate and brought into engagement with the tape by a solenoid operated cantilever spring. The capstan is directly driven by a brushless motor for which the speed of operation is controlled electrically. The various constituents of the unit, including forward motion and rewind motors and solenoids for controlling the pinch roller assembly and the position of the main deck plate, are operated from motion control circuitry and accompanying circuitry that is used to sense the beginning and the end positions of the cassette tape.

10 Claims, 9 Drawing Figures

CONTROLLED TRANSPORT OF A FLEXIBLE MEDIUM

BACKGROUND OF THE INVENTION

This application is a continuation-in-part of application Ser. No. 159,502 filed July 2, 1971 now abandoned. The invention relates to the controlled transport of flexible media and more particularly to the transport of tape that is used in the storage of information.

Tape transport units are electro-mechanical devices which are widely employed in data processing and other systems. Although such devices are not as rapid in their operation as, for example, the electronic memories of computer central processors, they are able to store large amounts of information at comparatively low cost. Their principal limitations are mechanical. Thus, if the tape head is not precisely positioned with respect to the tape being transported, errors occur in both the storage and retrieval of the information. Moreover, since vibration is inevitable in mechanical devices, any imprecision in the relative position of the tape and its tape head causes an increasing error as the speed of operation is increased. Another consequence of imprecision is that the density of information storage on the tape has to be reduced. Moreover, to the extent that miniaturization is desired, the need for precision becomes increasingly critical. As the constituents of a mechanical system are reduced in size, the effect of a given amount of error is correspondingly increased.

Another important consideration in tape transport units is the need to reverse the direction of tape motion rapidly. This is particularly true of the transition from a high speed rewind of the tape to regular forward motion. At the same time, it is important to prevent tape slack which could result in tape breakage during a transition from one mode of operation to another.

There is also a liklihood of mechanical damage to the tape if the pressure applied to it by a drive roller with respect to a drive capstan is too great. Excess pressure will also produce undesirable wear and tear on the mechanical drive components. On the other hand, if the pressure is insufficient, there is often a tendency for slippage to occur, resulting in fluctuations in the tape drive and reducing the information package density that can be achieved. Still another consideration is the need for sensing the beginning and ending of the tape without resort to bulky and inefficient devices.

Accordingly, it is an object of the invention to expedite and simplify the storage and retrieval of information with respect to a flexible medium, particularly magnetic tape that is internally positioned in a cassette. A further object of the invention is to simplify the construction of tape transport units and permit them to operate at relatively high speeds without sacrificing their accuracy. Another object of the invention is to increase the packing density of information stored on a magnetic tape without sacrificing accuracy.

A still further object of the invention is to achieve a magnetic tape transport unit which is particularly suitable for miniaturization. It is also an object to achieve a tape transport with relatively fast start and stop times. A further object is to reduce the fluctuations in drive that occur in tape transport units, particularly when the tape is being driven at a comparatively high speed. Another object of the invention is to achieve tape transport units that are relatively shockproof. A further object is to simplify the sensing of the beginning and ending of a tape employed in a magnetic tape cassette.

Still another object of the invention is to avoid the need for mechanical linkages in the control of the capstan drive of tape transport units. In general, it is an object of the invention to eliminate the need for auxillary constituents such as cams, springs and linkage mechanisms that result in tape transport complexity and have a detrimental effect on the operation of such units, particularly when being operated at relatively high speeds.

In accomplishing the foregoing and related objects the invention provides a transport unit for a flexible medium, such as magnetic tape, in which the medium is accommodated by a first instrumentality that slidably receives a second instrumentality for acting on the medium, as by a tape head mounted on the second instrumentality to record and retrieve information on the tape. The second instrumentality is supported in its direction of slide and confined to that kind of movement. The unit includes means for controlling the position of the second instrumentality and the motion of the medium.

In accordance with one embodiment of the invention, the information bearing medium is magnetic tape of a cassette which is supported against two vertically disposed cassette support pins of a main deck plate, and the slidable member is an head plate that mounts a tape head for storing and reading information with respect to the tape of the cassette. The head plate is slidable along two support pins having major axes lying in a plane that is parallel to the plane of slide.

In order to achieve precision positioning of the head plate with respect to the main deck plate, the main deck plate is desirably of die-cast material to reduce the likelihood of warpage during machining. For precision positioning of the tape head with respect to the tape of the cassette, the cassette support pins have shoulders which are precisely positioned with respect to a reference position of the main deck plate, for example, its bottom surface. The support pins for slidably receiving head plate are in turn precisely positioned with respect to the reference position.

In order to permit the sensing of the beginning and end positions of the tape within the cassette, the invention provides for the incorporation of light elements within the cassette support pins. The light emmitted from the support pins shines through the tape, which is clear or apertured at the beginning and ending positions, and is received by photo electric sensors mounted on the slidable head plate.

To achieve accurate regulation of the motion of the tape and simplify the drive mechanism, the head plate has a pivotally mounted roller assembly with a roller wheel that is solenoid operated to engage the tape and sandwich it between the roller wheel and the drive capstan. The pressure applied to the tape by the wheel is controlled in accordance with the invention by a cantilever spring connected to the pivoted roller assembly at one end and to a solenoid at the other end. Because of the cantilever spring, there is flexure that provides a relatively constant pressure. This prevents damage to the tape and eliminates unnecessary wear and tear on the drive components.

In addition, in order to accurately control the speed of the capstan, without the need for mechanical linkages, the invention provides for drive of the capstan by a brushless D.C. motor, for which the speed is controlled electrically. This eliminates the need for cams and linkages by which speed control of the drive is ordinarily ahcieved.

The invention further provides special circuitry for the motion control components of the transport unit, including the forward motion motor of the cassette, the rewind motor and solenoids for positioning the head plate and pivoting the roller assembly.

In accordance with other aspects of the invention, when the forward motion motor is being driven, the rewind motor is also being driven through a current limiting resistor at a substantially reduced speed, and although overridden by the forward motion motor, provides an automatic tensioning effect. In addition, in the rewind mode of the transport unit a singletrip multivibrator stores charge which is applied to the forward motion motor when the rewind is terminated. This gives the forward motion motor a large pulse to bring about a quick stop and eliminate any slack that would otherwise occur in the tape. The motion control circuitry further includes inputs from sensing logic circuitry to assure appropriate tape operation when the tape of the cassette is at its beginning, ending and intermediate positions.

BRIEF DESCRIPTION OF THE DRAWINGS

Other aspects of the invention will become apparent after considering several illustrative embodiments taken in conjunction with the drawings in which.

DETAILED DESCRIPTION OF THE ILLUSTRATIVE EMBODIMENTS

Figure 1:
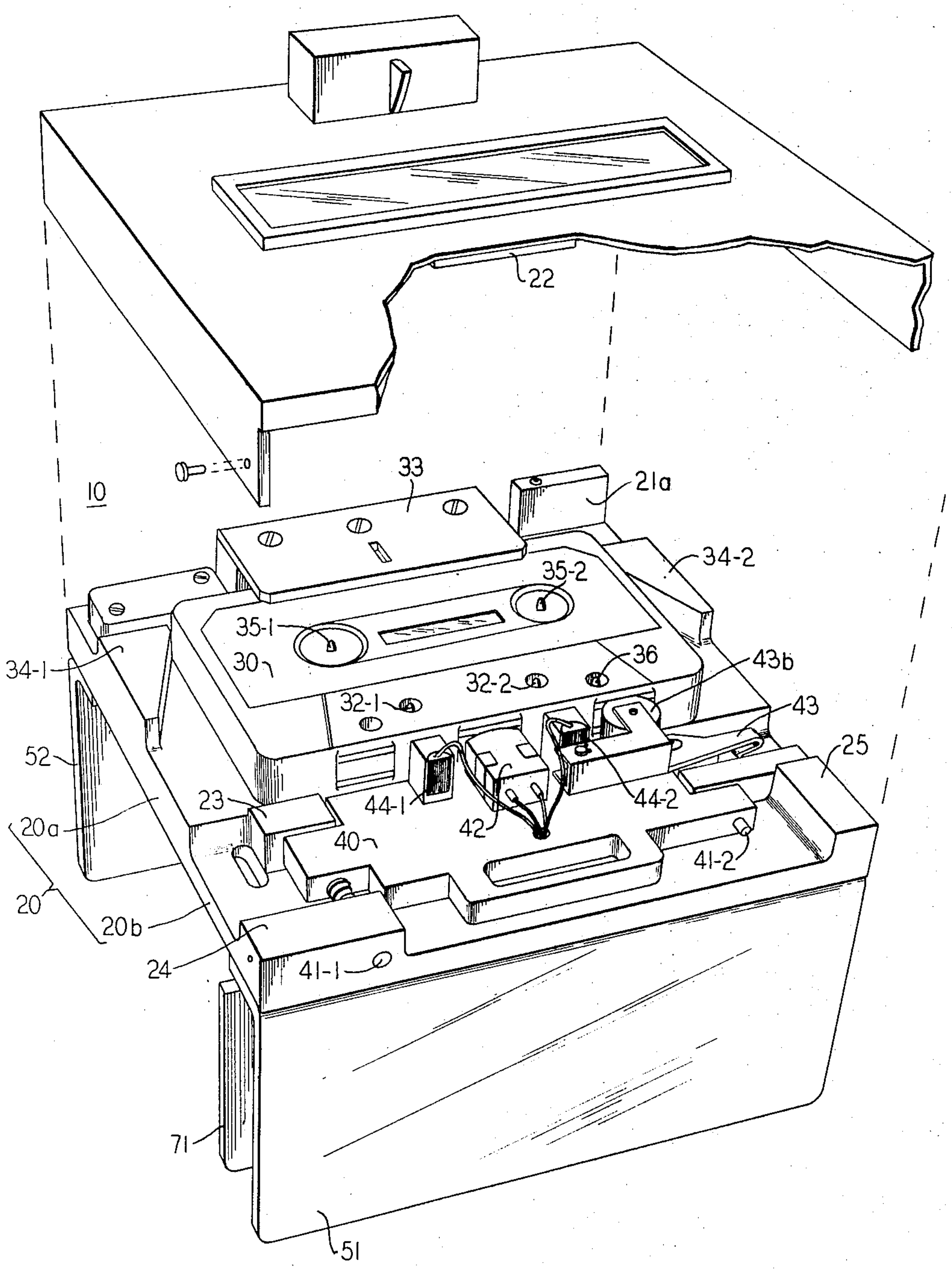
FIG. 1 is a perspective view of a tape transport unit in accordance with the invention.

Turning to FIG. 1 of the drawings, a tape transport unit 10 in accordance with the invention includes a diecast main deck plate 20 with a back portion **20*a* that accomodates a tape assembly such as a cassette 30, and a front portion 20*b* that slidably receives a spring-loaded head plate 40 on support pins 41-1 and 41-2. A cover shown exploded away from the unit 10 is pivotally mounted on the front portion 20*b* of the main deck plate 20.**

The cassette 30, which contains a strip of magnetic tape that is fed from an internal supply reel to an internal take-up reel, is held in position against cassette support pins 32-1 and 32-2 beneath a clip 33 between guide blocks 34-1 and 34-2. Loading springs (not visible in FIG. 1) beneath the clip 33 securely position the cassette 30 against the support pins 32-1 and 32-2. In addition, the take-up reel within the cassette 30 is operated by a forward motor shaft 35-2, while the source reel is operated by a rewind shaft 35-1. The rate of movement of the tape is determined by the operation of a drive capstan 36.

The slidable spring-loaded head plate 40 on the front portion **20*b* of the deck plate 20, which carries a tape head 42 for acting on the tape of the cassette 30, is shown in its retracted position in FIG. 1. The head plate 40 also carries a pivotally mounted pinch roller assembly 43. The head plate 40 is supported in its direction of slide and restricted to movement in that direction by the pins 41-1 and 41-2 which have their major axes in a plane parallel to the plane of slide. When the head plate is released, the tape head 42 moves into contact with the tape at a central aperture of the cassette 30. The pivotally mounted pinch roller assembly 43 on the head plate 40 is then operated to sandwich the tape between the drive capstan 36 and a roller wheel 43*b*. Photo sensors 44-1 and 44-2 mounted on the head plate 40 opposite the cassette support pins 32-1 and 32-2** monitor the beginning and ending positions of the tape.

The main deck plate 20 is itself supported by members 51 and 52, illustratively of sheet metal, which form a housing for the various motor and control components of the unit 10, including a circuit board 71, which are described below.

To ready the unit 10 for operation, the cassette 30 is inserted between the guides 34-1 and 34-2 with its back edge beneath the clip 33. The cassette is then pushed to the rear and downwards. Loading springs beneath the clip 33 serve to hold the cassette in place against the support pins 32-1 and 32-2. If the cassette 30 does not become fully seated as a result of manual placement, subsequent closure of the cover will complete the seating by pressure applied to the upper surface of the cassette by a hold-down member 22, illustratively of neoprene. Full closure of the cover trips a switch **21*a* to release the head plate 40.** Before the release takes place, however, the hold-down member assures the cassette is fully seated.

Operation of the unit 10 takes place as described below. After the head plate 40 is released its tape head 42 contacts the tape and actuation of the pinch roller assembly 43 brings the roller **43*b* against the drive capstan 36, causing the tape to be advanced past the head 42 from the internal supply reel to the internal take-up reel of the cassette 30.**

Figure 2A:
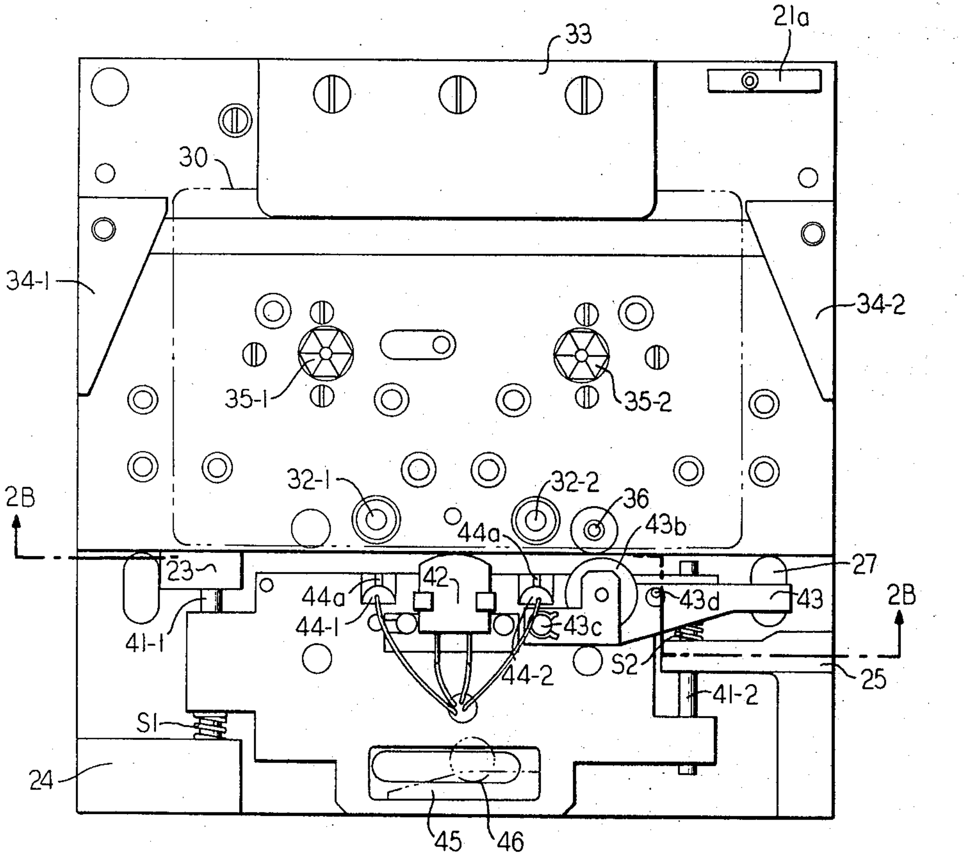
FIG. 2A is a top view of the tape transport unit of FIG. 1.

Details of the relationship between the main deck plate 20 and the head plate 40 are illustrated by the top view of FIG. 2A, in which the cassette 30 is shown in phantom outline. The support pins 41-1 and 41-2 for the head plate 40 are journalled in two separated mounting blocks 23 and 24 for the first pin 41-1 and in a single mounting block 25 for the second pin 41-2. The various mounting blocks 23 through 25 are integral with the main deck plate 20. As a result the first head plate pin 41-1 has two regions of support, while the second pin 41-2 has a single region of support, producing a tripod mounting of the head plate 40.

The support pins 41-1 and 41-2 carry respective coil springs S1 and S2. With the head plate 40 retracted as shown in FIG. 2A the coil springs S1 and S2 are compressed. When the head plate 40 is released as described above, the pressure exerted by the springs drives the head plate 40 towards the cassette. Because the head plate 40 is spring loaded forward, the cassette is spring loaded against the guide and support pins 32-1 and 32-2, the back of the cassette is spring loaded against the guide surface, the front of the cassette is against the hold-down member 22 (FIG. 1), the tape head 42 is largely unaffected by any inadvertent shock to which the unit becomes subjected, without need for complex catch mechanisms.

FIG. 2A additionally shows a wedge block 45 (in phantom) which is employed in conjunction with a control knob 46 for manually holding the head plate 40 in its retracted position. The manual control is not needed when the cover (FIG. 1) is used.

In order to achieve a high degree of accuracy at relatively high tape operating speeds, the invention provides for precision alignment between the head plate 40 and the cassette 30. To achieve this result, the invention provides for a die-cast main deck plate 20. This use of a casting prevents the warpage that is commonly encountered with other kinds of structural configurations.

Figure 2B:
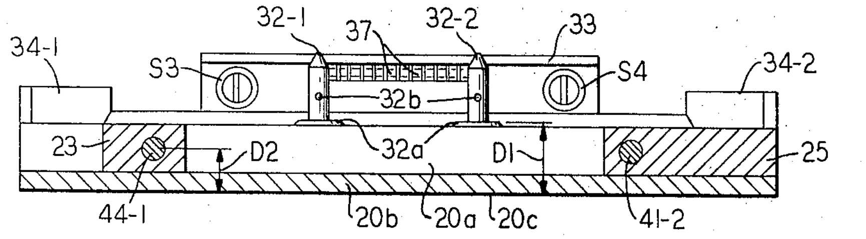
FIG. 2B is a front sectional view of the main deck plate of the unit of FIG. 2A.

Furthermore as illustrated by FIG. 2B, the main deck plate has an accurately controlled reference surface 20*c*. Using the surface 20*c* as a reference, the cassette support pins 32-1 and 32-2 are provided with lower platforms 32*a* that are a precise distance D1 above the reference surface 20*c*. As a result, when the cassette is mounted upon the rear portion 20*b* of the main deck plate 20, the tape 31 is precisely positioned with respect to the reference plane 20*c*. In addition, the centers of the support pins 41-1 and 41-2 are also precisely located with respect to the reference surface 20*c* a distance D2. Since the tape head 42 (FIG. 2A) is mounted upon the head plate 40, the precise positioning of the head plate pins 41-1 and 41-2 and the cassette pins 32-1 and 32-2 assures that the tape head is precisely positioned with respect to the magnetic tape 31. Spring fingers 37 below the clip 33 are compressed when the back edge of the cassette 30 (FIG. 1) is inserted and eliminates any gap between the cassette and the clip. Coil springs S3 and S4 apply pressure to position the cassette 30 against the pins 32-1 and 32-2.

Also shown in FIG. 2B for the pins 32-1 and 32-2 are light apertures 32*b* for internally located light elements. Light emitted from the apertures 32*b* falls upon respective photo cell sensors 44-1 and 44-2 (FIG. 2A) and provides a simple, reliable and efficient way of sensing the beginning and the end of the tape 31 within the cassette 30. When the end of tape position is reached by the operation of the forward motion post 35-2, the tape is at least partially devoid of the magnetic oxide coating that stores the recorded information allowing light from the aperture of the pin 32-1 to fall upon the photo sensor 44-1. Conversely, when the tape is fully rewound with respect to the rewind post 35-1, the leader of the tape is at least partly clear, permitting light from the pin 32-2 to fall upon the photo sensor 44-2. For all intermediate positions of the tape there is a magnetic oxide coating on the tape which prevents light from shinning on the sensors, and control circuitry described below operates accordingly.

Figure 2C:
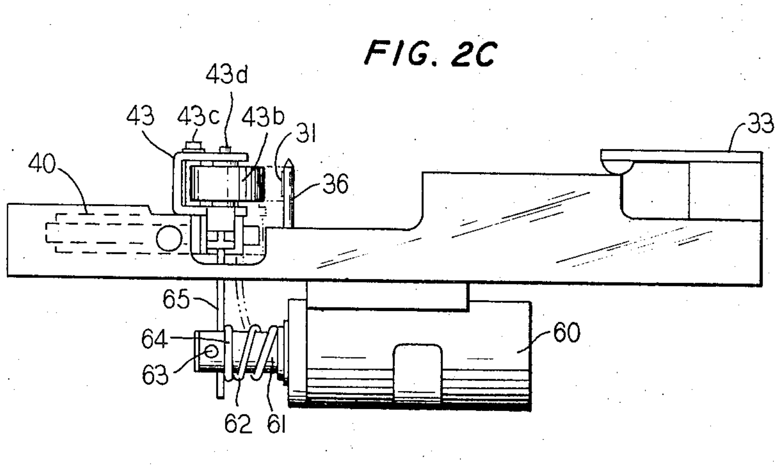
FIG. 2C is a right side view of the unit of FIG. 2A showing some of the constituents beneath the main deck plate.

FIG. 2C illustrates the precision control that is achieved in the drive of the tape 31 by the capstan 36 with respect to the drive roller 43*b*. After the head plate 40 is released and driven towards the drive capstan 36, there is still no tape movement until the pinch roller 43*b* engages the tape 31. This is accomplished by the operation of pinch roller solenoid 60 which has an armature 61 mounting a coil spring 62, a pin 63, a retainer 64 and one end of a cantilever spring 65. The latter extends through an aperture 27 in the main deck plate 20 (FIG. 2A) into engagement with the pivoted pinch roller assembly 43. When the solenoid 60 is operated, its armature 61 is drawn into the housing and becomes seated, carrying the end of the cantilever spring 65 with it as shown in phantom. This causes the pinch roller assembly to pivot about a pin 43*c* (FIG. 2A) and bring the tape 31 into contact with the drive capstan 36. The extent of the pivoted movement is limited by a stop pin 43*d* (FIG. 2A). Because of flexure of the cantilever spring 65, as shown in phantom, excess pressure cannot be applied to the tape. In effect, the spring 65 serves as a self regulator of the pressure on the tape. In addition, the pivotal mounting of the pinch roller assembly permits engagement with tape without resort to complex linkages and cam mechanisms. Since the armature 62 is fully seated within the housing, there is the same cantilever spring tension for each operation of the solenoid 60 with maximum damping effect.

Figure 2D:
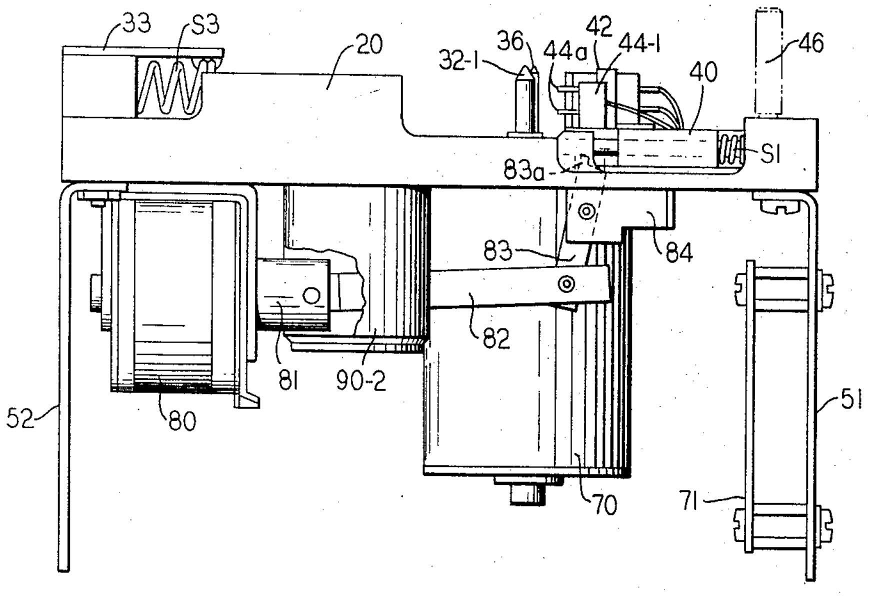
FIG. 2D is a left side view of the unit of FIG. 2A showing other constituents beneath the main deck plate.

Other components within the compartment formed between the housing plates 51 and 52 are shown in FIG. 2D. In particular, a head plate solenoid 80, which has been energized to draw an armature 81 into the solenoid housing, is shown with a first pivoted linkage 82 and a second linkage 83 that is pivoted within a block 84. The second linkage 83 extends through an aperture in the main deck plate 20 where its finger 83*a* engages a slot in the slidable head plate 40 and maintains it in the completely retracted position until the solenoid 80 is deactivated by, for example, closure of the cover (FIG. 1) to operate the switch 21*a*. In the rewind mode of operation, the solenoid 80 is actuated by the motion control circuitry described below and released either when the rewind is terminated as when the begining of the tape is sensed.

Also shown in FIG. 2D is a rewind drive motor 90-2 which acts upon the rewind post 35-1 (FIG. 2A) and a capstan drive motor 70, which is controlled from components on a circuit board 71 in a manner described below.

Figure 3:
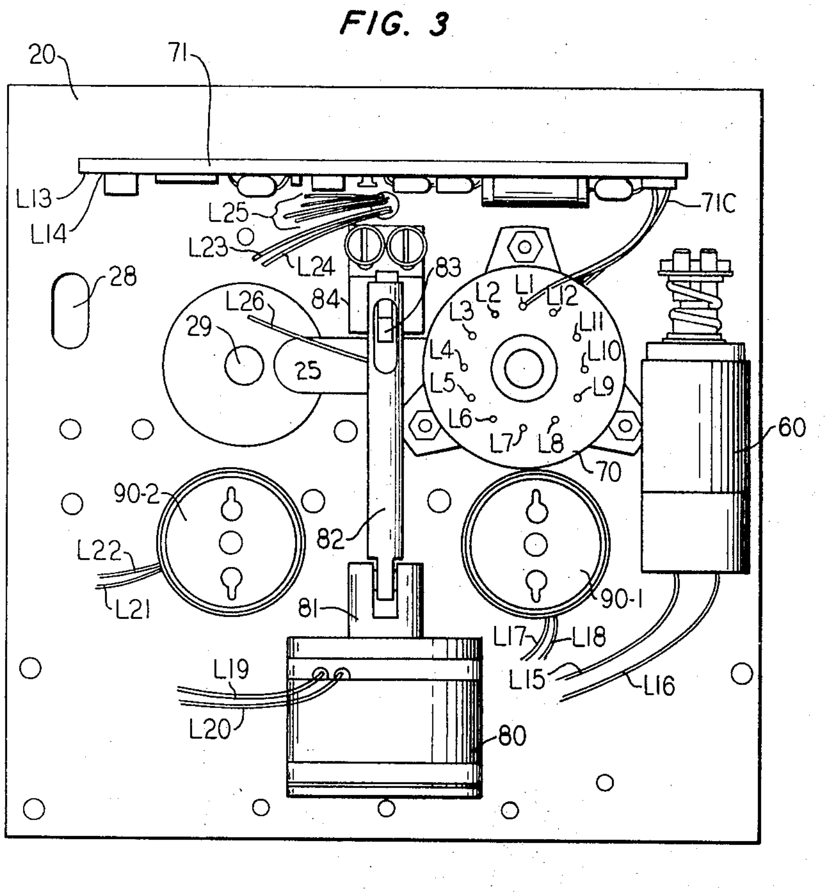
FIG. 3 is a bottom view of the unit of FIG. 1.

An overall view of the constituents of beneath the plate 20 is shown in FIG. 3. The capstan drive motor 70 has 12 control leads L1 through L12 which extend within a harness 71*c* to the circuit board 71 and are connected to the components of the circuit board as described in conjunction with FIG. 4. The components of the circuit board 71 are energized in conventional fashion through leads L13 and L14.

The pinch roller solenoid 60 has leads L15 and L16 which extend to the motion control circuitry of FIG. 5A described below.

Similarly the forward motion motor 90-1 has leads L17 and L18 extending to the motor control circuitry. The head plate solenoid 80 has leads L19 and L20 extending to the motor motion control circuitry. The rewind motor 90-2 has leads L21 and L22. Also shown in FIG. 3 are leads L23 and L24 which extend from respective sensors 44-1 and 44-2 of FIG. 2A to the sensing circuitry of FIG. 5B. A final set of four leads collected within a cable L25 extends from the tape head 42 (FIG. 2A) to conventional circuitry for recording and reading the magnetic tape 31.

FIG. 3 additionally shows a printed circuit board 25 which is used to energize the light elements within the cassette positioning pins 32-1 and 32-2. A lead L26 extends from the printed circuit board and is connected to energize the lights within the pins. This arrangement, i.e., using the printed circuit board 25, has the advantage of avoiding wire connections in that part of the underside location of the main deck plate where space is at a premium. It also eliminates the need for wire connections which could become detached by mechanical stresses and strains applied during usage of the tape transport unit. Apertures 28 and 29 are included in the plate 20 to permit the installation of a reverse drive motor corresponding to the forward drive motor 70, and a reverse drive solenoid, corresponding to the solenoid 60, where reverse drive is desired.

The drive motor 70 is a brushless D.C. motor of the kind described in Bulletin 1AD/G of Siemens America, Incorporated, published September 1969. The use of this motor permits a direct drive of the capstan and eliminates the need for linkages and mechanical multipliers, etc. It also permits exclusively electrical control over the operation of the motor and thus eliminates the other kinds of mechanical linkages and levers which are undesirable in a tape transport unit.

Figure 4:
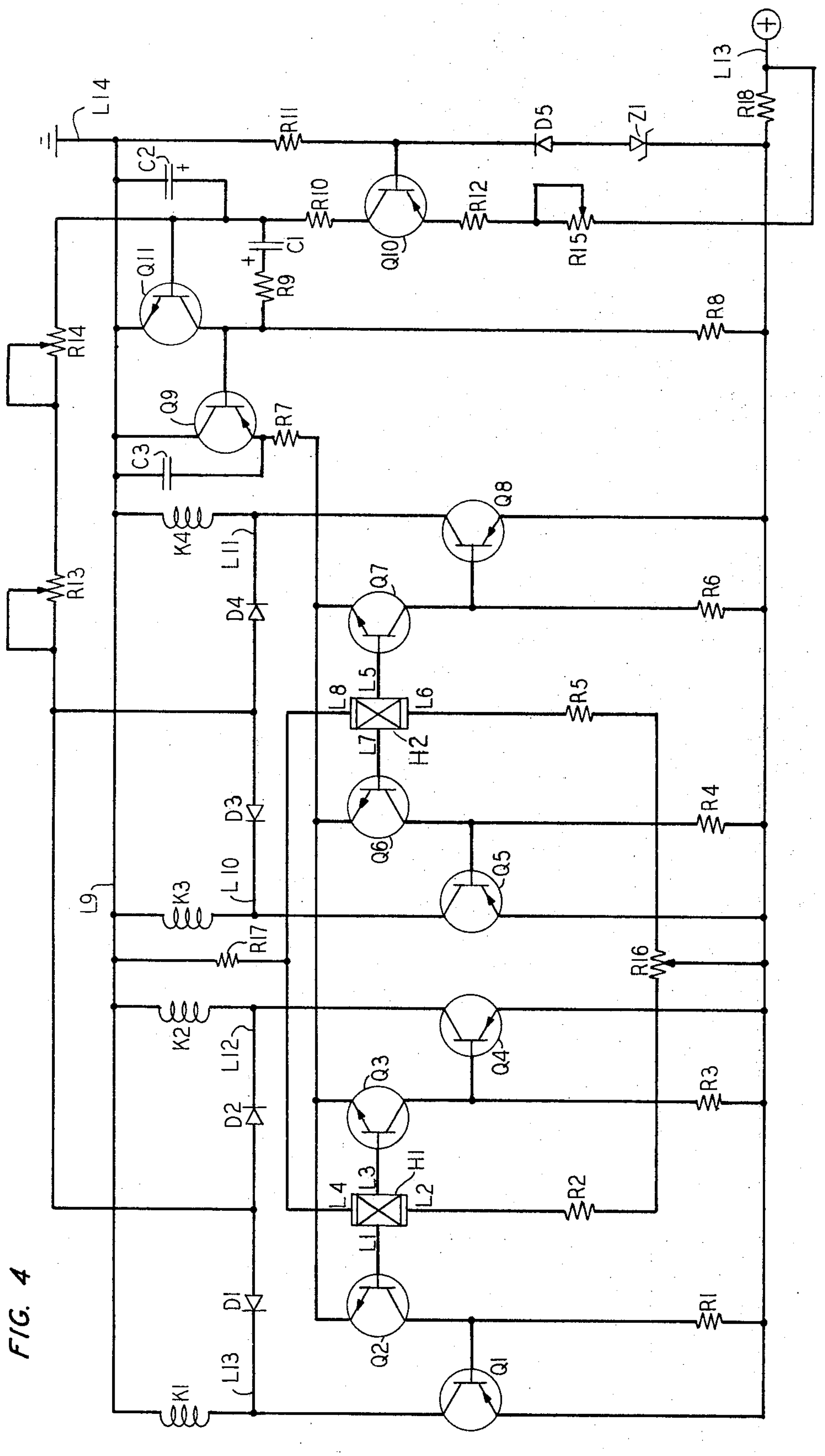
FIG. 4 is a schematic diagram for the drive capstan motor control circuitry of the unit of FIG. 1.

The basic control circuitry for the motor 70, mounted on the printed circuit board 71, is shown in FIG. 4. It is energized by leads 13 and 14 which correspond to those of FIG. 3. The motor 70 has a permanent magnet rotor and two Hall-effect generators H1 and H2, each 90° apart to sense the North and South pole positions of the rotor. The motor 70 includes four stator coils K1 through K4 connected in common with respect to lead L9 and with individual leads, L10 through L13. For each coil there is a pair of transistors connected to one of the Hall generators. For example, the first Hall generator H1 has a pair of transistors Q1 and Q2 for coil K1 and a second pair of transistors Q3 and Q4 for coil K2. In operation the Hall generators act like a commutator. For example, when the second Hall generator H2 is in an appropriate position, it biases transistor Q7 "on" to provide a path for transistor Q8 to energize coil K4. Further rotation of the rotor affects subsequent coils in sequence. The back emf generated by the motor is rectified by diodes D1 through D4 and is fed back where it is compared with an accurately maintained reference voltage produced by Zener diode Z1 and its associated temperature compensation diode D5 to produce the proper voltage for the Hall generators. This voltage is isolated from the speed characteristics of the motor allowing a wide fluctuation in input voltage with little or no effect on motor speed. The speed of the motor 70 is adjustable over a wide range by adjusting the resistance of the resistors R13 and R14 in the feedback path.

Figure 5B:
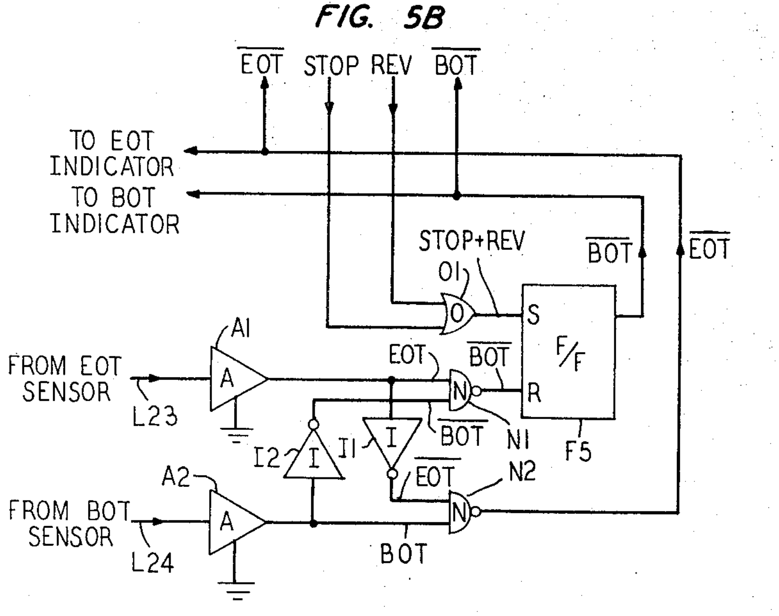
FIG. 5B is a schematic diagram for the tape sensing circuitry used in conjunction with the motion control circuitry of FIG. 5A.
Figure 5A:
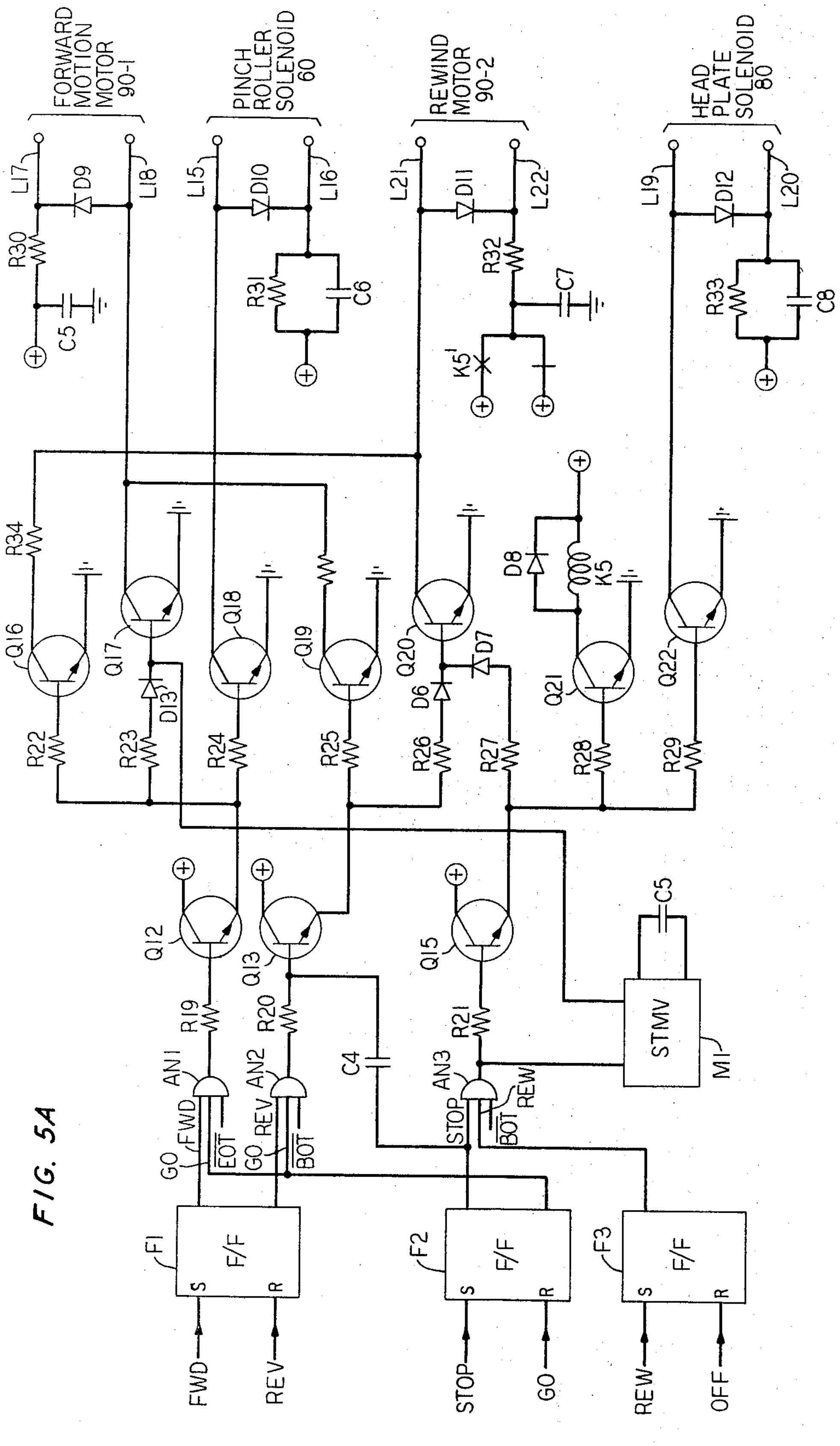
FIG. 5A is a schematic diagram for the motion control circuitry of the unit of FIG. 1.

The motion control circuitry for the transport unit 10 is shown in FIG. 5A, which operates in conjunction with the sensing circuitry of FIG. 5B. Positive logic is employed in which a binary "1" is a positive value of voltage and a binary "0" is at ground level. The motion control functions are exercised externally to the transport unit 10 at three flip-flops F1 through F3 which are conventional two-state devices. A signal corresponding to a binary "1" at the setting input terminal S produces signal corresponding to a binary "1" at the associated output terminal. Similarly, a binary "1" at the resetting input terminal R produces a corresponding binary "1" output.

The flip-flop F1 is set with a "forward" command FWD applied, for example, from a control panel (not shown) in standard fashion. Flip-flop F1 is re-set by a "reverse" command REV. The "reverse" command input in FIG. 5A is merely illustrative since no reverse drive motor is included in the embodiment of FIG. 1.

The second flip-flop F2 is set by a "stop" command STOP and re-set by a "go" command GO. Finally, the third flip-flop F3 is set by a "rewind" command REW and re-set by an "off" command OFF.

The outputs from the flip-flops F1 through F3 enable selective ones of AND gates AN1 through AN3. The first of the AND gates AN1 is enabled by the combination of a "forward" command FWD, a "go" command GO and the absense of an end of tape indication EOT, the latter being supplied from the circuitry of FIG. 5B. When the gate AN1 is enabled, it energizes a pair of transistors Q12 and Q18 which are connected as a "Darlington Pair" for current gain only. The second transistor Q18 provides a ground for the pinch roller solenoid 80 causing it to be operated. Simultaneously with the operation of the pinch roller solenoid, the transistor Q17 provides a ground return to operate the forward motion motor 90-1. In addition, the rewind motor 90-2 is operated through the transistor Q16 by way of a resistor R34. The result is that the rewind motor 90-2 is energized at a low signal level so that the forward motion motor 90-1 can override the rewind motor, which is nevertheless able to eliminate any slack in the tape 31 of the cassette 30.

It is to be noted that earlier closure of the cover (FIG. 1) operated a switch 21*a* to deactivate the head plate solenoid 80 and release the head plate 40. Consequently, the occurrence of "forward" and "go" commands FWD and GO, together with the absense of and end of tape indication permits the tape to be transported in its forward motion mode.

The third AND gate AN3 is enabled to rewind the tape by the concurrence of a "rewind" command REW, a "stop" command STOP and the absense of a beginning of tape indication BOT. It is to be noted that the "stop" and "go" commands are mutually exclusive at the second flip-flop F2. Enablement of the rewind AND gate AN3 operates the head plate solenoid 80 by providing a ground return at transistor Q22 to retract the head plate 40. The rewind motor is 90-2 and is simultaneously operated at a high rate of speed by virtue of the operation of a relay K5 which switches a relatively higher voltage to the motor through transfer contacts K5'. The lower voltage level is employed when the rewind motor is used for reverse motion of the tape. Ground for the rewind motor 90-2 is provided by the transistor Q20.

The rewind interval is terminated by an "off" command OFF. This produces a negative going output and the rewind AND gate AN3 that activates a single trip multivibrator M1 to discharge a capacitor C5 for a specified pulse interval through the forward motion transistor Q17 at its base. The result is a ground path through the transistor Q17 for the forward motion motor 90-1 for the duration of the multivibrator pulse interval. Consequently, the forward motion motor 90-1 is activated momentarilly at the end of the rewind interval to accentuate the stopping effect.

A similar "stopping" assist is provided when the forward motion is terminated by a "stop" command STOP. A pulse from the "stop" output of the second flip-flop F2 is applied through a capacitor C4 to the reverse transistor Q13, resulting in momentary actuation of the rewind motor 90-2 through transistor Q20.

The sensing indications for the beginning of the tape and the ending of the tape (BOT and EOT) are obtained from the circuitry of FIG. 5B. Respective indications from the EOT and BOT sensors 44-1 and 44-2 are applied to respective inverter amplifiers A1 and A2. The outputs of the amplifiers are applied directly and by cross coupling inverters I1 and I2 to NAND gates N1 and N2. In addition, the stop and rewind commands are applied to set a flip-flop F5 through an OR gate 01. As a result, there is a signal corresponding to a binary "1" on the EOT line whenever the tape 31 of the cassette 30 is not in its end of tape position. Similarly there is a signal corresponding to a binary "1" on the BOT line whenever the tape is not in its beginning of tape position.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

What is claimed is:

1. Apparatus for transporting magnetic tape within a cassette comprising, a deck plate with cassette support pins having shoulders that are precisely positioned with respect to a reference surface of said deck plate, a head plate bearing a tape head and slidably supported on first and second cylindrical support pins which are supported by said deck plate and have their major longitudinal axes lying in a plane that is parallel to the deck plate, with the first of said pins supporting said head plate along one continuous region of support and the second of said pins supporting said head plate along two distinctive and continuous regions of support, the head plate support pins having their longitudinal centerlines precisely spaced with respect to said reference surface of said deck plate, means for controlling the position of siad head plate with respect to said magnetic tape, and means for moving said magnetic tape relative to said head plate, thereby to permit the tape head to be accurately positioned with respect to said magnetic tape.

2. Tape transport apparatus as defined in claim 1 wherein said deck plate is fabricated as a casting to limit warpage.

3. Tape transport apparatus as defined in claim 1 wherein said cassette support pins include an aperture in each of two pins for the emission of light against the magnetic tape of said cassette, thereby to permit the detection and sensing of the beginning of said tape by one pin and the ending of said tape by the other pin.

4. Apparatus for transporting a flexible medium comprising a first plate for accommodating the flexible medium, a second plate slidably receivable by the first plate for acting upon said flexible medium, the second plate being supported by pins which extend thereinto in the direction of slide thereof and which are fixed to said first plate, means for controlling the position of said second plate with respect to said flexible medium, a drive capstan for said flexible medium rotationally mounted on said first plate, a lever pivotally mounted on said second plate, said lever having a pinch roller rotationally mounted thereon for holding said flexible medium against said capstan, a cantilever spring having one end connected to said lever, and an actuator connected to the other end of said cantilever spring, whereby the cantilever spring controls the pressure applied to said flexible medium against said capstan by said pinch roller.

5. Apparatus as defined in claim 4 wherein said actuator is a solenoid having an armature and one end of said cantilever spring is directed to said armature.

6. Apparatus as defined in claim 4 wherein said cantilever spring is disposed at a generally right angle to the direction of motion of said second plate.

7. Apparatus as defined in claim 4 wherein said drive capstan is directly driven by a brushless D.C. motor.

8. Apparatus as defined in claim 4 further including means for advancing said medium in a forward direction, means for advancing said medium in a reverse direction, and means for momentarily actuating the forward advance means during the reverse motion of said medium when the reverse means is deactivated.

9. Apparatus as defined in claim 4 further including means for maintaining said second plate in a retracted position until said medium is to be transported.

10. Apparatus as defined in claim 4 further including means for detecting the beginning of said flexible medium.

* * * * *